United States Patent
Rothenstein

(10) Patent No.: US 6,896,450 B2
(45) Date of Patent: May 24, 2005

(54) MACHINE REAMER AND REAMING HEAD FOR A MACHINE REAMER

(75) Inventor: Achim Rothenstein, Fellbach (DE)

(73) Assignee: Komet Praezisionswerkzeuge Robert Breuning GmbH, Besigheim (DE)

(*) Notice: Subject to any disclaimer, the term of this patent is extended or adjusted under 35 U.S.C. 154(b) by 203 days.

(21) Appl. No.: 10/220,360

(22) PCT Filed: Jan. 24, 2001

(86) PCT No.: PCT/EP01/00730

§ 371 (c)(1),
(2), (4) Date: Dec. 4, 2002

(87) PCT Pub. No.: WO01/64381

PCT Pub. Date: Sep. 7, 2001

(65) Prior Publication Data

US 2003/0143044 A1 Jul. 31, 2003

(30) Foreign Application Priority Data

Mar. 1, 2000 (DE) .......................... 100 09 721

(51) Int. Cl.⁷ .............................. B23B 51/02
(52) U.S. Cl. ............... 408/59; 408/233; 408/239 R; 408/713; 279/8
(58) Field of Search .............. 408/57, 59, 227, 408/231, 232, 233, 238, 239 R, 713; 279/8; 407/48, 50

(56) References Cited

U.S. PATENT DOCUMENTS

| 327,315 | A | * | 9/1885 | Richardson | 408/226 |
|---|---|---|---|---|---|
| 1,472,798 | A | | 11/1923 | Gyllsdorff | |
| 1,515,548 | A | * | 11/1924 | Cerotsky | 408/229 |
| 1,724,005 | A | * | 8/1929 | Christensen | 408/201 |
| 2,153,236 | A | * | 4/1939 | Christman | 407/33 |
| 2,867,140 | A | * | 1/1959 | Getts | 408/57 |
| 3,307,243 | A | | 3/1967 | Andreasson | |
| 3,320,833 | A | * | 5/1967 | Andreasson | 408/57 |
| 4,099,889 | A | * | 7/1978 | Vig | 408/239 R |
| 4,461,602 | A | * | 7/1984 | Zettl | 407/40 |
| 4,929,131 | A | * | 5/1990 | Allemann | 409/234 |
| 4,979,851 | A | * | 12/1990 | Hunt | 408/143 |
| 5,163,790 | A | * | 11/1992 | Vig | 408/57 |
| 5,238,335 | A | * | 8/1993 | Nomura | 408/59 |
| 5,607,263 | A | * | 3/1997 | Nespeta et al. | 407/61 |
| 5,851,094 | A | | 12/1998 | Strand et al. | |
| 6,494,648 | B2 | * | 12/2002 | Harpaz | 407/30 |

FOREIGN PATENT DOCUMENTS

| CH | 645 051 | | 9/1984 | |
|---|---|---|---|---|
| DE | 3402547 | * | 8/1985 | |
| DE | 195 11 257 | | 10/1995 | |
| DE | 197 19 892 | | 11/1998 | |
| EP | 504 100 | | 9/1992 | |
| JP | 64-002815 | * | 1/1989 | 408/227 |

* cited by examiner

Primary Examiner—Daniel W. Howell
(74) Attorney, Agent, or Firm—Flynn, Thiel, Boutell & Tanis, P.C.

(57) ABSTRACT

The invention relates to a machine reamer, with a shaft-like base body (10) and a reaming head (12), projecting axially from the front face of the base body. According to the invention, the reaming head is in the form of a one-piece exchangeable cutting tip (12), which may be chucked into a tip seat (14) on the front face of the base body (10), in a coaxially self-centering manner, in order to maintain a high precision coaxialism, despite low material and construction requirements.

36 Claims, 8 Drawing Sheets

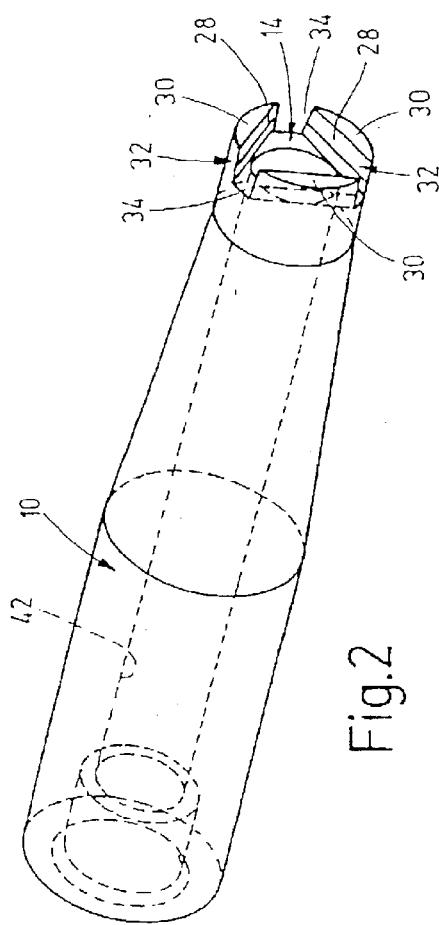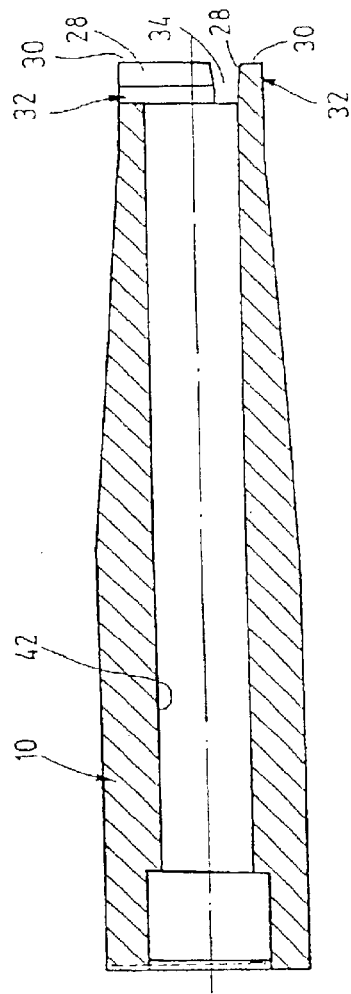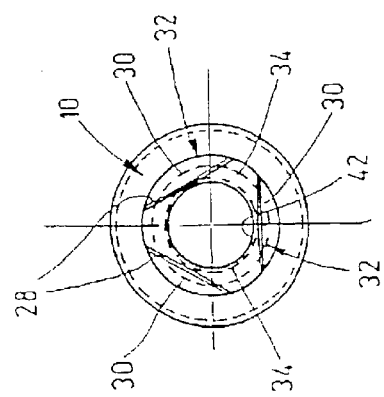

Figure 1A:
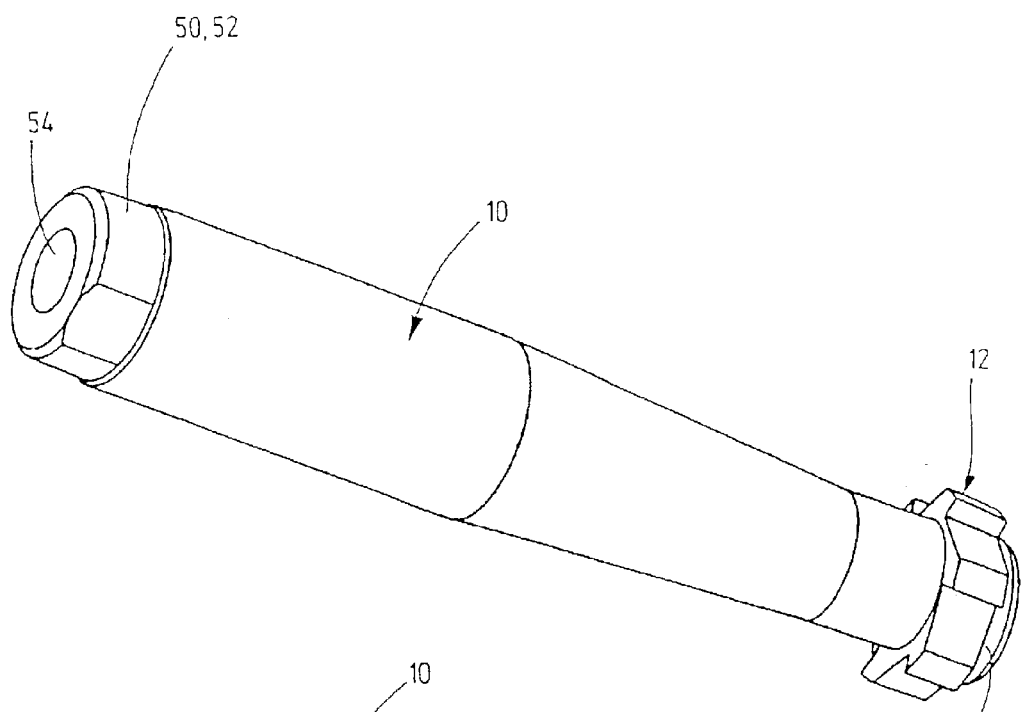

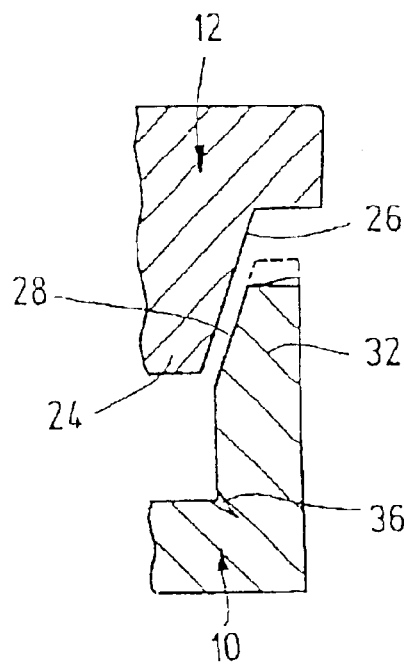
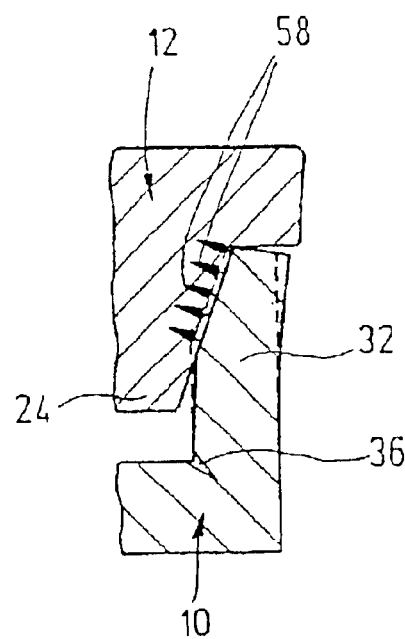
Fig.9a　　Fig.9b
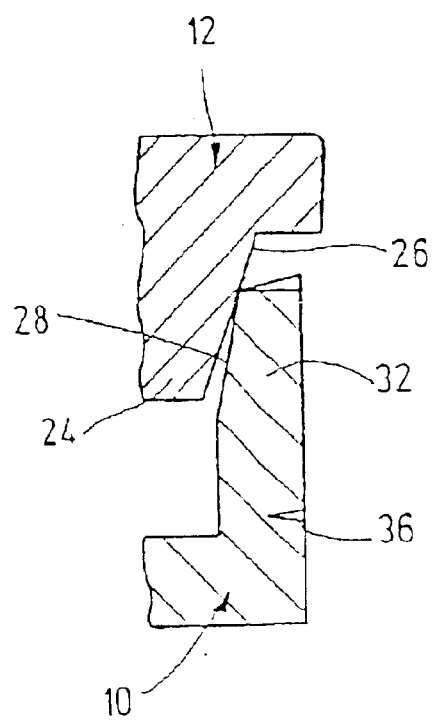
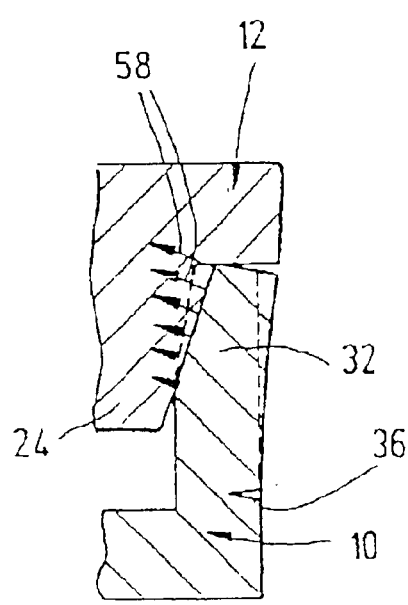
Fig.10a　　Fig.10b

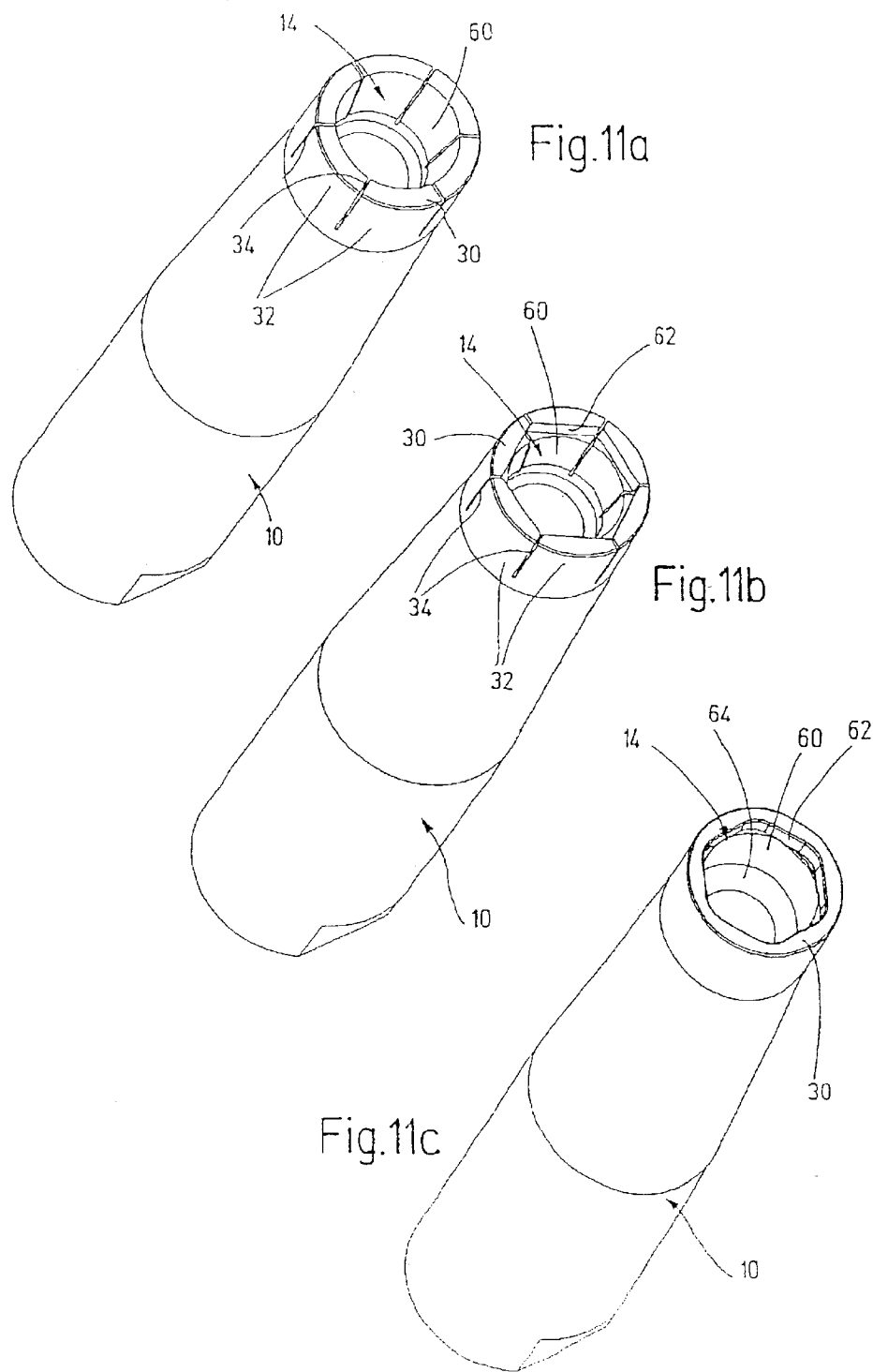

MACHINE REAMER AND REAMING HEAD FOR A MACHINE REAMER

DESCRIPTION

The invention relates to a machine reamer comprising a shaft-like base body and a reaming head projecting axially from the end face beyond the base body.

Machine reamers of this type are used for the precision working of cylindrical bores with the goal of a high degree of accuracy in dimension and form. The cutting work is done by the main cutting teeth on the face of the conical chamfered portion, whereas the secondary cutting edges in the axially following guide portion serve to guide the tool. An important characteristic of the machine reamer is the coaxialism of the reaming head with respect to the axis of rotation. The cutting edges in so-called monoblock reamers are directly soldered into a base body. The monoblock reamers including the base body must when worn be completely exchanged. The use of multi-toothed monoblock reamers on machine tools is therefore extremely expensive. In order to avoid this disadvantage and in order to obtain acceptable tool life adjustable reamers are today increasingly being used. Small adjusting paths, however, limit here also the achievable cost advantages.

Starting from this, the basic purpose of the invention is to reduce the material and construction expense in machine reamers and yet to achieve good machining results.

To attain this purpose the characteristics disclosed in Patent claims 1 and 16 are suggested. Advantageous embodiments and further developments of the invention result from the dependent claims.

The basic thought of the solution of the invention is that the reaming head is designed as a one-piece exchangeable cutting tip, which can be chucked without play and in a coaxially auto-centering manner into an end face of a radially expandable tip seat of the base body. In order to achieve this it is suggested according to a first modified embodiment of the invention that the exchangeable cutting tip has a shoulder, which projects axially beyond a rearward facing planar surface, and which has at least three key surfaces, which are arranged at preferably equal angular distances from one another, and supplement one another to form a regular frustum, and that the tip seat has at least three inclined surfaces, which are arranged at preferably equal angular distances from one another, and are complementary to the key surfaces of the sides of the regular frustum, and which terminate in a planar end surface, against which axially abuts the rearward facing planar surface of the exchangeable cutting tip in the assembled state. A play-free driving rotation between the base body and the exchangeable cutting tip is guaranteed with these measures.

A preferred embodiment of the invention provides that the tip seat has at least three clamping members, which are arranged at preferably equal angular distances from one another, are separated by axially and/or radially open spacing gaps, and each have one of the inclined surfaces, and the chucking surfaces of which clamping members clamp a plane forming the planar end surface. The clamping members are advantageously dimensioned in such a manner that they can be elastically expanded relative to the axis of the base body like a cantilevered beam under the action of the applied force. An improvement in this respect is achieved in such a manner that the base body has inside of the tip seat at least three axially and/or radially open expansion slots, which are arranged at preferably equal angular distances from one another, whereby the expansion slots are advantageously arranged in the base area of the respective clamping members. In order to permit the clamping members to expand, it is advantageous when the slope angle of the inclined surfaces on the side of the base body is smaller than the slope of the key surfaces on the side of the tips. As an alternative, it is possible to choose the slope angles of the inclined surfaces on the side of the base body and of the key surfaces on the side of the tips to be the same. In order to enable an expansion in this case, the planar surfaces on the end of the base body and on the end of the tips must be spaced at a defined distance from one another in an initial joining position of the connecting partners. The slope angle of the key surfaces and/or of the inclined surfaces is advantageously 5° to 10° relative to the axis of the base body.

A second advantageous modified embodiment of the invention provides that the auto-centering tip seat has a conical socket, which is arranged in the planar end surface of the base body, and has an internal polygon-sided socket, which is arranged between the conical socket and planar end surface, whereas the reaming head has an outer conical section, which projects coaxially rearwardly from a planar surface, and can be placed into the conical socket, and has an outer polygon-sided socket, which is oriented between the outer conical section and the annular planar surface, and is complementary with respect to the inner polygon-sided socket. The reaming head abuts also in this case in the assembled state with its annular planar surface against the planar end surface of the base body. A preferred embodiment of the modification of the invention provides that at least two clamping members are provided, which are arranged at preferably equal angular distances from one another, and are separated from one another by spacing gaps, which are arranged in the area of the inner polygon-sided socket corners, and are axially and/or radially open, the chucking surfaces of which clamping members together define a plane forming the planar end surface, and can be elastically expanded relative to the axis of the base body under the action of the applied force.

A third advantageous modified embodiment of the invention provides that the auto-centering tip seat has a fitting cylinder, which is arranged in the planar end surface of the base body, and has an inner polygon-sided socket, which is arranged between the fitting cylinder and the planar end surface, whereas the reaming head has a cylindrical fitting pin, which coaxially projects rearwardly from an annular planar surface, and can be placed into the fitting cylinder, and is over dimensioned relative to the fitting cylinder, and has an outer polygon-sided section, which is oriented between the fitting pin and the annular planar surface, and is complementary to the inner polygon-sided socket. The reaming head axially abuts also in this case with its annular planar surface in the chucked state against the planar end surface of the base body. A feed cone is advantageously arranged in the tip seat between the fitting cylinder and the inner polygon-sided socket. For the same reason it is possible for the reaming head to have a feed cone, which is arranged near the end face of its fitting pin.

A fourth advantageous modified embodiment of the invention provides that the auto-centering tip seat has a conical socket, which is arranged in the planar end surface of the base body, whereas the reaming head has a rearwardly coaxially projecting outer conical section projecting from an annular planar surface and can be inserted into the conical socket. The tip seat has in this case furthermore at least two clamping members, which are arranged preferably at equal angular distances from one another, and are separated by axially and/or radially open spacing gaps, and the end surfaces of which members together define a plane forming the planar end surface. It is thus possible that the reaming head rests with its annular planar surface in the chucked state against the planar end surface of the base body, and that the clamping members are elastically expanded relative to the axis of the base body under the action of the applied force.

The exchangeable cutting tip can be chucked advantageously into the tip seat by means of a centrally disposed cap screw. As an alternative, it is possible for the exchangeable cutting tip to be chucked in the tip seat by means of a tie bar, which centrally and axially extends through the base body. The tie bar can thereby be provided with a center bore for passage of a cooling lubricant.

A preferred embodiment of the invention provides that the exchangeable cutting tip consists of a hard, preferably sintered cutting material. Advantageous cutting materials are hereby HSS (a high performance high-speed cutting steel), hard metal, CBN (cubic bornitrite), PKD (polycrystalline diamond) or ceramics. The exchangeable cutting tip carries, if necessary, a friction-reducing coating. In order to be able to work expeditiously, the exchangeable cutting tips are advantageously designed to be multi-toothed, whereby in order to improve the work result an uneven tooth pitch is provided.

Relatively small exchangeable cutting tips, the guide portion of which is advantageously chosen to be shorter than half of the tip diameter, are sufficient with the measures of the invention.

A significant advantage of the invention is that in the case of wear only the reaming head must be exchanged. The relatively expensive base body remains. The measures of the invention assure that the coaxialism of the exchangeable cutting tips is guaranteed. The determining factor for this is the auto-centering inclined abutment and the planar surface abutment of the exchangeable cutting tip in the tip seat.

Figure 1B:
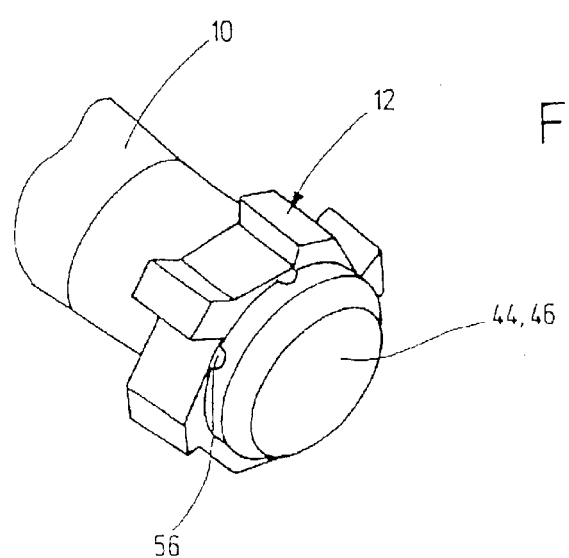

The invention will be discussed in greater detail hereinafter in connection with the exemplary embodiments schematically illustrated in the drawings, in which:

FIG. 1*a* is a diagrammatic illustration of a machine reamer with an exchangeable cutting tip;

FIG. 1*b* is a diagrammatic view of the front face of the machine reamer according to FIG. 1*a;*

Figure 4A:
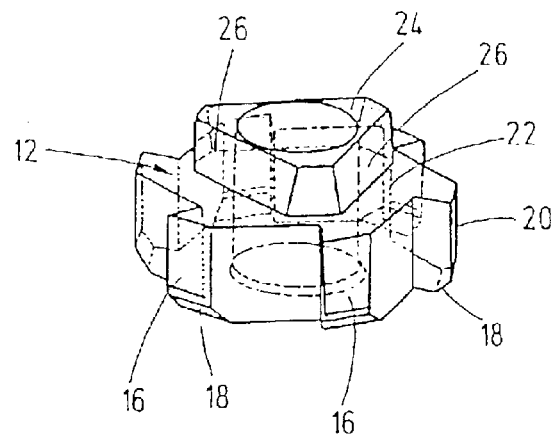
Figure 4B:
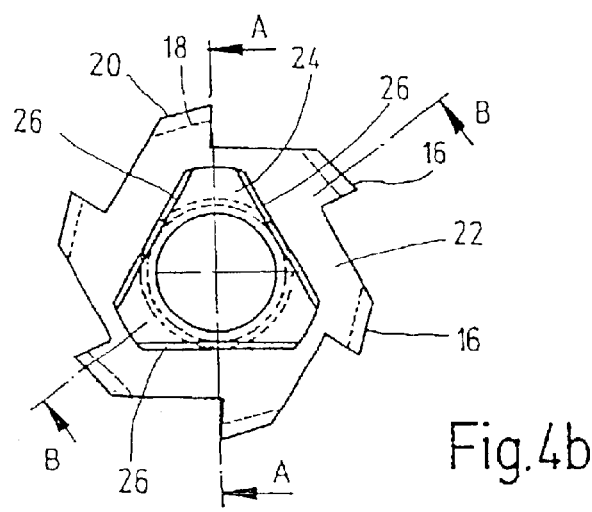
Figure 5A:
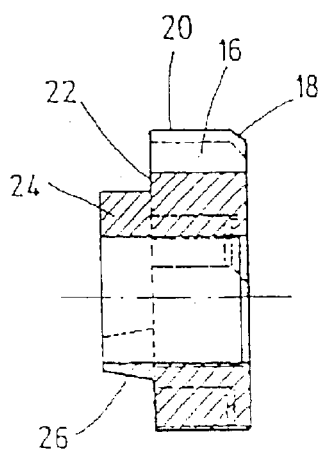
Figure 5B:
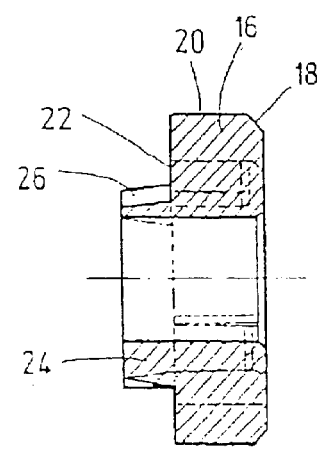

FIG. 2 is a diagrammatic illustration of the base body of the machine reamer;

FIG. 3*a* is a longitudinal cross-sectional view of the base body according to FIG. 2;

FIG. 3*b* is a view of the front face of the base body according to FIG. 2;

FIGS. 4*a* and *b* are a diagrammatic illustration and a top view of the reaming head designed as an exchangeable cutting tip;

FIGS. 5*a* and *b* are two cross-sectional views along the cross-sectional lines A—A and B—B of FIG. 4*b;*

Figure 6A:
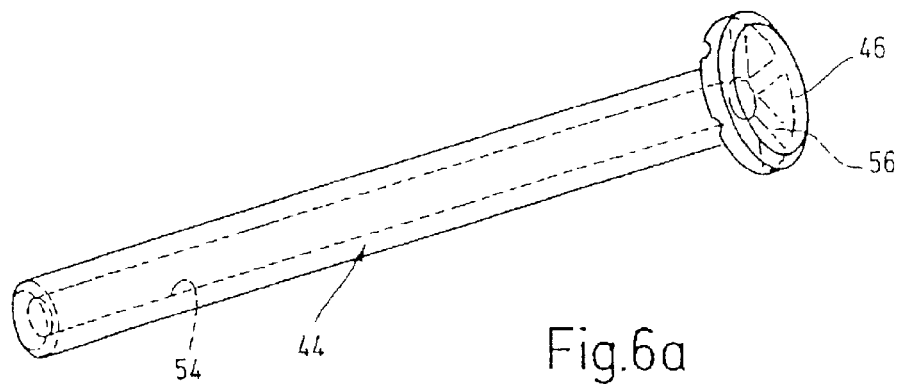
Figure 6B:
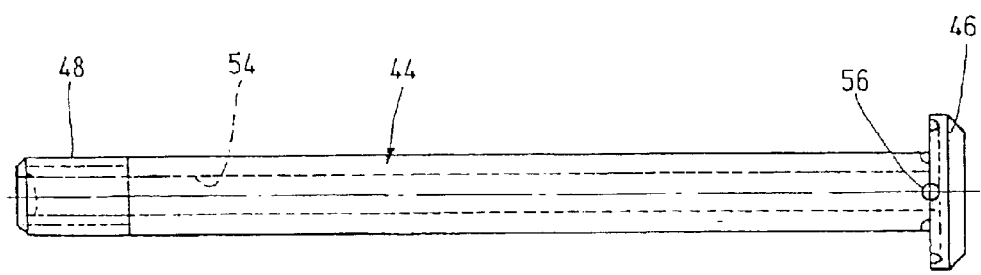
Figure 6C:
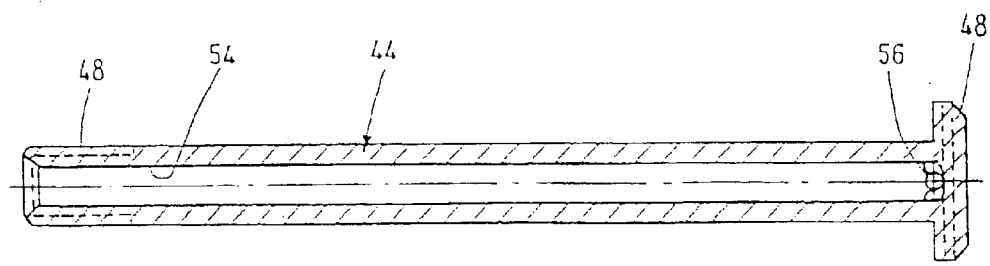

FIGS. 6*a* to *c* are diagrammatic illustrations of a side view and a longitudinal cross-sectional view of the dowel pin of the machine reamer according to FIGS. 1*a* and *b;*

Figure 7A:
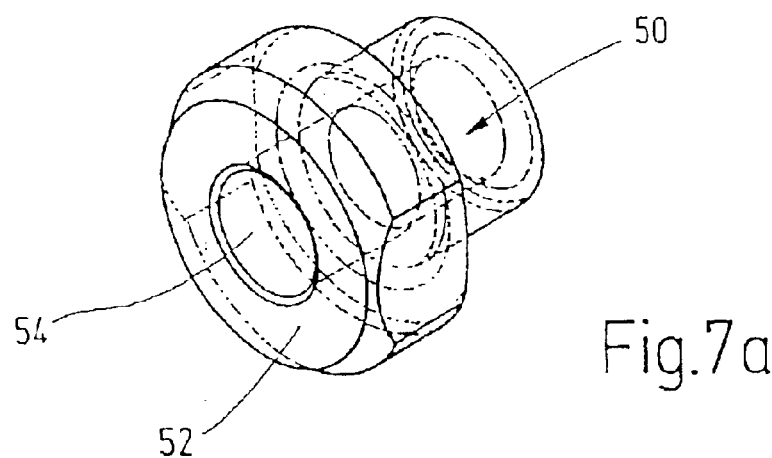
Figure 7B:
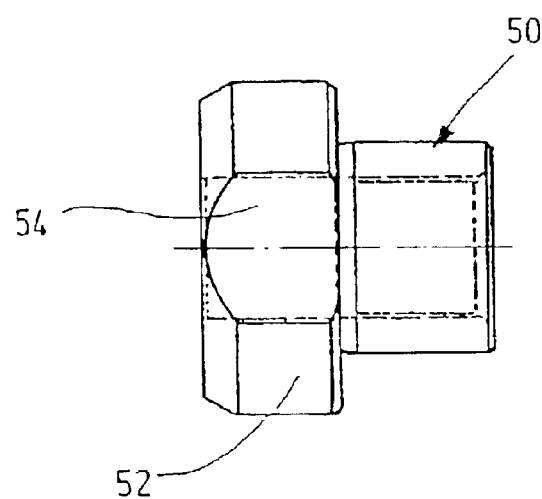
Figure 7C:
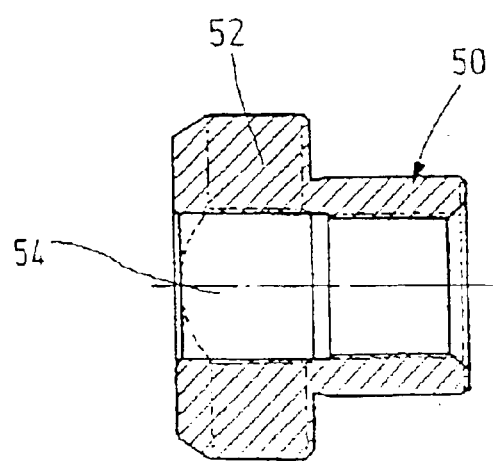

FIGS. 7*a* to *c* are diagrammatic illustrations of a side view and a longitudinal cross-sectional view of the chucking nut of the machine reamer according to FIGS. 1*a* and *b;*

Figure 8A:
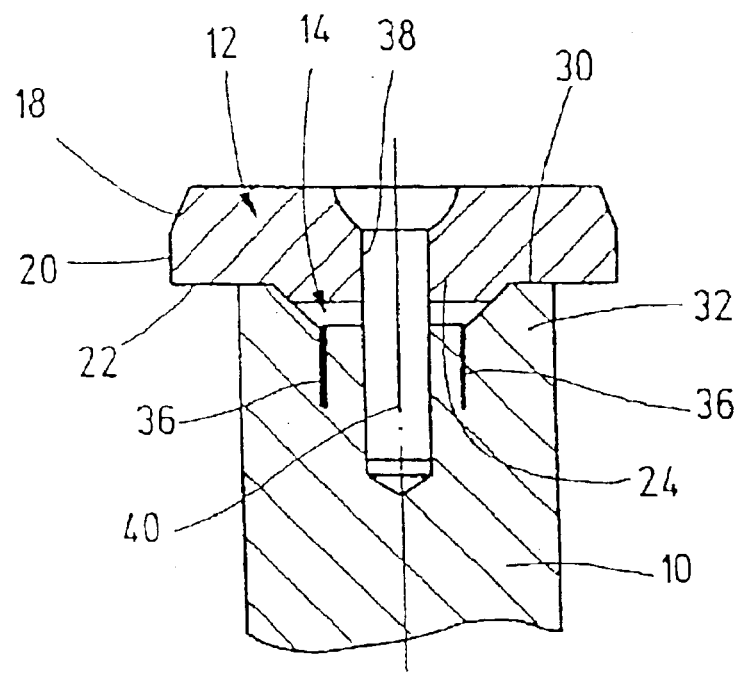
Figure 8B:
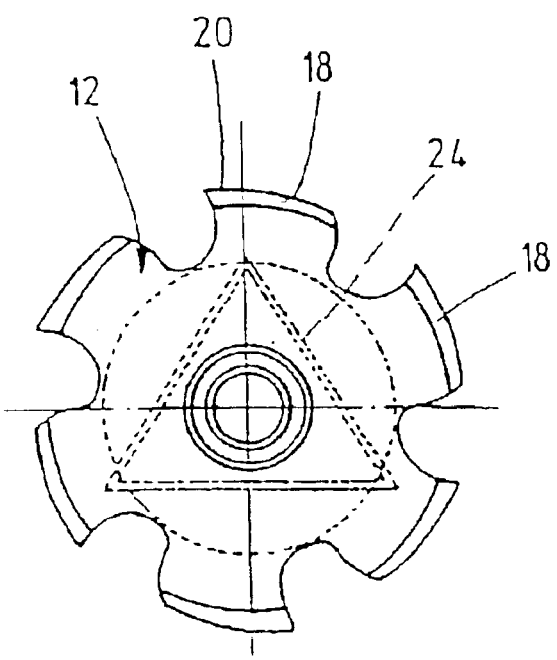

FIGS. 8*a* and 8*b* are a detailed cross-sectional illustration and a top view of a machine reamer, which has been modified with respect to FIGS. 1 to 7;

FIGS. 9*a* and *b* illustrate an exemplary embodiment for producing an auto-centering force within the tip seat;

FIGS. 10*a* and *b* illustrate an exemplary embodiment, which has been modified with respect to FIGS. 9*a* and *b*, for producing an auto-centering force in the tip seat;

FIGS. 11*a* to *c* illustrate three further modified embodiments of a base body of the machine reamer in an illustration corresponding to FIG. 2.

The machine reamers illustrated in the drawings have a base body 10 designed as a shaft and a reaming head axially projecting beyond the base body. The reaming head is designed as a one-piece exchangeable cutting tip 12, which can be chucked without play and coaxially auto-centering in response to an axially applied force into a front-face tip seat 14 of the base body 10. The exchangeable cutting tip 12, which consists of a sintered cutting material, in particular of hard metal, has several cutting teeth 16, which are arranged spaced from one another in circumferential direction, and the tooth pitch of which is non-uniform. The cutting teeth 16 each have an inclined chamfered portion 18, which assumes during the machining operation the important cutting work. The chamfer angle is 45° to 60° in the illustrated exemplary embodiments. The chamfered portion 18 transitions axially rearwardly into the guide portion 20, which has mainly a guiding function within the bores to be machined. As can in particular be seen in FIGS. 1*a*, *b* and 4*a*, the length of the guide portion 20 is reduced to a minimum in the illustrated exemplary embodiments. The guide portion 20 is defined at its rear end by a planar surface 22. The exchangeable cutting tip 12 has furthermore a shoulder 24, which projects axially beyond the planar surface 22, and which has three key surfaces 26, which are arranged at equal angular intervals from one another and supplement one another to form an axial frustum. Thus, it is possible to anchor the exchangeable cutting tip without play in the tip seat 14.

The tip seat 14 has for this purpose three inclined surfaces 28, which are arranged at equal angular distances from one another and are complementary with respect to the key surfaces 26 of the tip-side frustum, and which terminate in a planar end face surface 30. The planar surface 22 of the exchangeable cutting tip 12 engages against the planar surface 30 of the tip seat 14 when forcibly inserted therein. The inclined surfaces 28 are arranged on each clamping member 32 forming the tip seat 14, which clamping members 32 are circumferentially separated by axially open spacing gaps 34 at equal angular distances from one another on the base body 10. The clamping faces of the clamping members 32 together clamp a plane forming the planar end face surface 30. The clamping members 32 are dimensioned in such a manner that they can be expanded like elastic cantilevered beams relative to the base body axis under the action of the axially applied force. An improvement in this respect is achieved by the base body 10 having expansion slots 36, which are arranged at equal angular distances from one another inside of the tip seat in the root area of the respective clamping members 32, and which are open axially toward the end face (compare FIG. 8*a*). The exchangeable cutting tip 12 has an axial bore 38 for facilitating a fastening to the base body 10. The exchangeable cutting tip 12 is in the exemplary embodiment illustrated in FIGS. 8*a* and *b* chucked to the end face of the tip seat by means of a cap screw 40.

The exchangeable cutting tip 12 can in the exemplary embodiment according to FIGS. 1 to 7 be chucked in the tip seat 14 by means of a dowel pin 44 extending through an axial bore 42 of the base body 10. The dowel pin 44 rests for this purpose with its head 46 against the end face surface of the exchangeable cutting tip 12. The dowel pin 44 has at its end not facing the head 46 an external thread 48, onto which the chucking nut 50 illustrated in FIGS. 7a to c can be screwed. The chucking occurs by tightening of the head 52 of the chucking nut 50 against the rearward end face of the base body 10 (FIG. 1a). The dowel pin 44 and the chucking nut 50 each have an axial bore 54, the bore 54 in the dowel pin terminating radial channels in the area of the dowel pin head 46. Cooling lubricant is supplied to the cutting edges 16 through the axial bore 54 and the radial channels 56.

The auto-centering fitting of the exchangeable cutting tips 12 in the tip seat 14 is made possible by the two components of the assembly abutting without initial tension prior to an engagement of the two planar surfaces 22 and 30 so that an elastic expansion of the clamping members 32 occurs during a chucking operation. This is made possible on the one hand by the two planar surfaces 22 and 30 being spaced from one another in the assembled condition, however, non-tensioned state with the key and inclined surfaces 26, 28 being parallel (FIG. 9a). The same purpose can be achieved by the slope angle of the inclined surfaces 28 on the side of the base body being steeper compared to the axis of the base body than the slope angle of the key surfaces 26 (FIG. 10a). By suitably dimensioning the connecting components, a surface bearing pressure indicated by the arrows 58 and a force occurs in both cases due to the elastic bending of the clamping members 32, and at the same time an abutment in the area of the planar surfaces 22, 30. In order to guarantee a specific expansion, radially and/or axially open expansion slots 36 are formed into the base area of the clamping members 32. A high degree of coaxial alignment of the exchangeable cutting tip 12 and the base body 10 is achieved by these precautionary measures.

The base body diagrammatically illustrated in FIGS. 11a to c differs from the exemplary embodiment according to FIG. 2 in the design of the end region of the tip seat 14.

The tip seat 14 according to FIG. 11a has a conical socket 60 in the planar end face surface 30. The tip seat is thereby formed by six clamping members 32, which are arranged at equal angular distances from one another and are separated from one another by axially open spacing gaps 34, the end face surfaces of which clamping members 32 define together a plane forming the planar end face surface 30. When a reaming head with a coaxially projecting outer conical surface is inserted into this tip seat, the clamping members 32 are elastically expanded relative to the base body 10 under the action of the axially applied force. An auto-centering of the exchangeable cutting tip 12 on the base body 10 results therefrom.

The exemplary embodiment illustrated in FIG. 11b shows instead of the conical socket 60 a hexagon socket 62. When the shoulder 24 of the exchangeable cutting tip 12 has in this case an outer hexagon surface complementary to the hexagon socket 62, play-free driving rotation will occur. The spacing gap 34, with which the clamping members 32 are separated from one another, are arranged in this case at the mutually adjacent corners of the hexagon socket 62.

The exemplary embodiment illustrated in FIG. 11c has a conical socket 60 and a hexagon socket 62 in addition to a fitting cylinder 64. The conical socket 60 has here the function of a feed cone for the shoulder of the exchangeable cutting tip, which shoulder has a corresponding fitting cylinder. Furthermore, the spacing gaps 34 are missing here so that only a relatively small radial expansion over the conical socket 60 and the fitting cylinder 64 can occur during the chucking of the exchangeable cutting tip.

A high exchange precision is achieved by the grinding work of all exchangeable cutting tips occurring on one and the same master base body.

In summary, the following is to be stated: the invention relates to a machine reamer with a shaft-like base body 10 and a reaming head 12 projecting axially from one end face beyond the base body. In order to achieve, in spite of low material and construction costs, a high degree of precision in coaxialism, it is suggested according to the invention that the reaming head is designed as a one-piece exchangeable cutting tip 12, which can be chucked into an end face tip seat 14 of the base body 10 and in a coaxially auto-centering manner.

What is claimed is:

1. A machine reamer comprising a shaft-like base body, and a reaming head projecting axially from an end face of the base body, said reaming head comprising a one-piece exchangeable cutting tip including a shoulder which projects axially beyond a rearward facing planar surface and having thereon at least three key surfaces which are arranged at angular distances from one another, and supplement one another to form a regular frustum, the exchangeable cutting tip configured to be chucked in an auto-centering manner into an end face of a radially expandable tip seat of the base body, the tip seat having at least three inclined surfaces which are arranged at angular distances from one another, and are complementary to the key surfaces of the flat sides of the regular frustum, and terminate in a planar end surface against which axially abuts the rearward facing planar surface of the exchangeable cutting tip in an assembled state, wherein the exchangeable cutting tip is chucked in the tip seat by a member extending axially centrally into the base body.

2. The machine reamer according to claim 1, wherein the tip seat has at least three clamping members that are arranged at angular distances from one another, are separated by axially and/or radially open spacing gaps and that each have one of the inclined surfaces, wherein the surfaces of said clamping members together clamp in a plane defined by the planar end surface.

3. The machine reamer according to claim 2, wherein the clamping members are configured to be elastically expanded relative to the axis of the base body under the action of an axially applied force.

4. The machine reamer according to claim 1, wherein the slope angle of the key surfaces is 5° to 10° relative to the axis of the base body.

5. The machine reamer according to claim 1, wherein the slope angle of the inclined surfaces on the side of the tip seat is smaller than the slope angle of the key surfaces on the side of the tip.

6. The machine reamer according to claim 1, wherein the slope angles of the inclined surfaces on the side of the tip seat and of the key surfaces on the side of the tip are the same, and wherein the planar surfaces on the end of the tip seat and on the end of the tip are spaced at a defined distance from one another in an initial joining position.

7. The machine reamer of claim 1, wherein the member comprises a dowel pin including an axial bore configured to be supplied with a cooling lubricant.

8. The machine reamer according to claim 1, wherein the at least three key surfaces are arranged at equal angular distances from one another and the at least three inclined surfaces are arranged at equal distances from one another.

9. A machine reamer comprising a shaft-like base body, and a reaming head projecting axially from an end face of the base body, said reaming head comprising a one-piece exchangeable cutting tip configured to be chucked in an auto-centering manner into an end face of a radially expandable tip seat of the base body, wherein the exchangeable cutting tip is chucked in the tip seat by a dowel pin extending axially centrally through the base body, the dowel pin having a head resting against a face surface of the exchangeable cutting tip and an external thread at its end remote from the head, said external thread being configured to receive thereon a chucking nut which can be tightened with respect to the rearward end of the base body.

10. The machine reamer according to claim 9, wherein the dowel pin has an axial bore configured to be supplied with a cooling lubricant, the axial bore terminating at an area of a dowel pin head in radial channels extending to cutting teeth on the cutting tip.

11. The machine reamer according to claim 9, wherein the chucking nut has an axial bore communicating with the axial bore of the dowel pin.

12. The machine reamer according to claim 9, wherein the exchangeable cutting tip has several cutting teeth which are arranged spaced from one another.

13. The machine reamer according to claim 12, wherein the multi-toothed exchangeable cutting tip has an uneven tooth pitch.

14. The machine reamer according to claim 9, wherein the exchangeable cutting tip comprises a hard, sintered cutting material coated for reducing friction.

15. The machine reamer according to claim 14, wherein the exchangeable cutting tip comprises a cutting material of the group HSS, hard metal, CBN, PKD and ceramics.

16. The machine reamer of claim 9, wherein the dowel pin includes an axial bore configured to be supplied with a cooling lubricant.

17. A machine reamer comprising a shaft-like base body, and a reaming head projecting axially from an end face of the base body, said reaming head comprising a one-piece exchangeable cutting tip configured to be chucked in an auto-centering manner into an end face of a radially expandable tip seat of the base body, said base body having inside of the tip seat at least three expansion slots that are arranged at angular distances from one another in a base area of respective clamping members, and that are open axially and/or radially toward the end face, wherein the exchangeable cutting tip is chucked in the tip seat by a member extending axially centrally into the base body.

18. The machine reamer of claim 17 wherein said member comprises a centrally oriented cap screw.

19. A machine reamer comprising a shaft-like base body, and a reaming head projecting axially from an end face of the base body, said reaming head comprising a one-piece exchangeable cutting tip configured to be chucked in an auto-centering manner into an end face of a radially expandable auto-centering tip seat of the base body having a conical socket in a planar end surface of the base body and having an inner polygon-sided socket arranged between the conical socket and the planar end surface, wherein the exchangeable cutting tip has an outer conical section that projects axially beyond an annular rearward facing planar surface and is configured to be inserted into the conical socket and has an outer polygon-sided socket which is oriented between the outer conical section and rearward facing planar surface, and is complementary to the inner polygon-sided socket, and wherein the exchangeable cutting tip abuts with its rearward axially facing planar surface in an assembled state against the planar end surface of the base body, and the exchangeable cutting tip is chucked in the tip seat by a member extending axially into the base body.

20. The machine reamer according to claim 19, wherein the tip seat has at least two clamping members that are arranged at angular distances from one another, and which are separated from one another by axially and/or radially open spacing gaps arranged in corners of the inner polygon-sided socket, end surfaces of said clamping members defining together a plane forming the planar end surface, said end surfaces being elastically radially moveable relative to the axis of the base body under the action of an applied force.

21. The machine reamer according to claim 19, wherein the inner polygon-sided socket comprises a hexagon socket and the outer polygon-sided socket comprises an outer hexagonal socket.

22. A reaming head for a machine reamer, comprising a one-piece exchangeable cutting tip which has an axially extending central through-hole configured for reception of a dowel pin, and a shoulder which axially projects beyond a rearward facing planar surface, and which has at least three key surfaces arranged spaced at equal angular distances from one another, and the planes of which supplement one another to form a regular equal-sided pyramid.

23. A machine reamer comprising a shaft-like base body, and a reaming head projecting axially from an end face of the base body, said reaming head comprising a one-piece exchangeable cutting tip configured to be chucked in an auto-centering manner into an end face of a radially expandable auto-centering tip seat of the base body having a conical socket arranged in a planar end surface of the base body, wherein the exchangeable cutting tip has an outer conical section that projects axially beyond a rearward facing planar surface and is configured to be placed into the conical socket, wherein the exchangeable cutting tip is chucked in the tip seat by a centrally oriented member, and wherein the exchangeable cutting tip rests with its rearward facing planar surface in the chucked state against the planar end surface of the base body.

24. The machine reamer according to claim 23, wherein the tip seat has at least two clamping members that are arranged at angular distances from one another, and are separated from one another by axially and/or radially open spacing gaps, and end surfaces of said clamping members together defining a plane forming the planar end surface, and wherein the clamping members are configured to be elastically expanded relative to the axis of the base body under the action of an applied force.

25. A machine reamer comprising a shaft-like base body, and a reaming head projecting axially from the end face of the base body, said reaming head comprising a one-piece exchangeable cutting tip configured to be chucked in an auto-centering manner into an end face of a radially expandable auto-centering tip seat of the base body having a fitting cylinder in a planar end surface of the base body, and having an inner polygon-sided socket arranged between the fitting cylinder and the planar end surface, wherein the exchangeable cutting tip has a cylindrical fitting pin which projects beyond a rearward facing planar surface and is configured to be placed into the fitting cylinder, and is over dimensioned relative to the fitting cylinder, and has an outer polygon-sided section which is oriented between the fitting pin and the planar end surface, and is complementary to the inner polygon-sided socket, and wherein the exchangeable cutting tip abuts with its rearward axially facing planar surface in an assembled state against the planar end surface of the base body.

26. The machine reamer according to claim 25, wherein a conical feed socket, which terminates in the fitting cylinder, is arranged in the tip seat between the fitting cylinder and the inner polygon-sided socket.

27. The machine reamer according to claim 26, wherein the exchangeable cutting tip has a conical feed section which is arranged near the end face of the fitting pin.

28. A reaming head for a machine reamer, comprising a one-piece exchangeable cutting tip which has an axially extending central through-hole configured for reception of a dowel pin, a shoulder which axially projects beyond a rearward facing planar surface and has an outer conical surface thereon and, an outer polygon-sided section arranged between the outer conical section and the planar surface.

29. The reaming head according to claim 28, wherein the outer polygon-sided section comprises an outer hexagon section.

30. A reaming head for a machine reamer, comprising a one-piece exchangeable cutting tip which has an axially extending central through-hole configured for reception of a centrally oriented member, and a shoulder which axially projects beyond a rearward facing planar surface, and which has a cylindrical fitting portion and an outer polygon-sided section arranged between the fitting portion and the planar surface.

31. The reaming head according to claim 30, wherein the shoulder has a conical feed section passing over into the cylindrical fitting portion.

32. The reaming head according to claim 30, wherein the reaming head comprises a hard, sintered cutting material.

33. The reaming head according to claim 32, wherein the exchangeable cutting tip comprises a cutting material of the group HSS, hard metal, CBN, PKD and ceramics.

34. The reaming head according to claim 30, wherein the exchangeable cutting tip is multi-toothed.

35. The reaming head according to claim 30, wherein the exchangeable cutting tip has at least one of a cylindrical, crowned and conical guide portion which axially follows a chamfered portion, and which is shorter than half of the tip diameter.

36. The reaming head according to claim 30, wherein said centrally oriented member comprises a dowel pin.

* * * * *